United States Patent
Bontrager

[19]

[11] Patent Number: 6,149,230

[45] Date of Patent: Nov. 21, 2000

[54] BICYCLE SADDLE

[75] Inventor: Keith D. Bontrager, Santa Cruz, Calif.

[73] Assignee: Trek Bicycle Corporation, Waterloo, Wis.

[21] Appl. No.: 09/392,183

[22] Filed: Sep. 9, 1999

[51] Int. Cl.[7] .................................................. B62J 1/00
[52] U.S. Cl. .......................................... 297/202; 297/214
[58] Field of Search .............................. 297/202, 195.1, 297/214, 452.21, 452.24, 452.26, 452.27

[56] References Cited

U.S. PATENT DOCUMENTS

| | | | |
|---|---|---|---|
| D. 407,910 | 4/1999 | Terry | D6/354 |
| 574,503 | 1/1897 | Van Meter . | |
| 581,464 | 4/1897 | Hollenbeck . | |
| 615,077 | 11/1898 | Lovekin . | |
| 823,915 | 6/1906 | Brooks et al. . | |
| 2,770,287 | 11/1956 | Christensen | 155/9 |
| 3,708,201 | 1/1973 | Lamkemeyer | 297/214 |
| 3,815,953 | 6/1974 | Worley | 297/195 |
| 4,218,090 | 8/1980 | Hoffacker et al. . | |
| 4,572,575 | 2/1986 | Golden et al. | 297/195 |
| 4,662,677 | 5/1987 | Hughes | 297/195 |
| 4,768,826 | 9/1988 | Kashima | 297/195 |
| 4,850,643 | 7/1989 | Rollman | 297/214 |
| 4,898,422 | 2/1990 | West, III | 297/202 |
| 4,952,439 | 8/1990 | Hanson . | |
| 5,011,222 | 4/1991 | Yates et al. | 297/195 |
| 5,048,891 | 9/1991 | Yach | 297/195 |
| 5,074,618 | 12/1991 | Ballard | 297/199 |
| 5,076,642 | 12/1991 | Beylet et al. | 297/195 |
| 5,108,076 | 4/1992 | Chiarella | 297/195 |
| 5,165,752 | 11/1992 | Terry | 297/214 |
| 5,203,607 | 4/1993 | Landi . | |
| 5,356,198 | 10/1994 | Hughes | 297/195.1 |
| 5,362,126 | 11/1994 | Bontrager | 297/195.1 |
| 5,388,887 | 2/1995 | Read | 297/195.1 |
| 5,395,155 | 3/1995 | Yach | 297/215.14 |
| 5,524,961 | 6/1996 | Howard | 297/199 |
| 5,636,896 | 6/1997 | Howard | 297/199 |
| 5,645,315 | 7/1997 | Walker et al. . | |
| 5,714,108 | 2/1998 | Girardi et al. | 264/331.17 |
| 5,720,518 | 2/1998 | Harrison . | |

(List continued on next page.)

FOREIGN PATENT DOCUMENTS

WO 99/20517  4/1999  WIPO .

OTHER PUBLICATIONS

Unnumbered, two–sided color magazine page, illustrating two bicycle company advertisements: 1) Koobi "Splitfit Technology" bicycle saddle; 2) Specialized "Rockhopper A1 Comp," Sep. 1999 Mountainbike Magazine.

Selle ITALIA® 1999 product brochure: 6–page foldout illustrating a variety of bicycle saddles; ProNet Incorporated—Seattle, Washington distributor.

Photocopy of Specialized product brochure, "Saddles"; cover page and pp. 74–77.

Serfas® "Cycling Products 2000"; photocopy, 9–page product brochure illustrating a variety of Serfas® bicycle saddles.

Selle San Marco, "2000 Collezione": five–language, multi–manufacturer, 16–page product brochure (includes foldout front and back covers) for bicycle saddles.

Airgo™ (Stuttgart, Germany) bicycle saddle product brochure (three–page unnumbered, photocopy) by Hindsite™ Sports, Scottsdale, Arizona distributor.

*Primary Examiner*—Milton Nelson, Jr.
*Attorney, Agent, or Firm*—Boyle Fredrickson Ziolkowski S.C.; James F. Boyle

[57] ABSTRACT

A bicycle saddle for seating a bicycle rider includes a shell, foam padding, leather cover, a suspension rail, and a seating surface including right and left sides, divided by a substantially V-shaped open surface extending from a rear edge of the saddle forwardly, and a longitudinal depression extending from the apex of the V-shaped open space forwardly to the anterior portion of the saddle. The right and left sides of the saddle thereby provide laterally spaced apart left and right posterior support surfaces for supporting the right and left ischeal tuberosities of the bicycle rider, respectively.

14 Claims, 8 Drawing Sheets

U.S. PATENT DOCUMENTS

| | | | |
|---|---|---|---|
| 5,765,912 | 6/1998 | Bontrager | 297/214 |
| 5,863,094 | 1/1999 | Endo | 297/201 |
| 5,873,626 | 2/1999 | Katz | 297/202 |
| 5,904,396 | 5/1999 | Yates . | |
| 5,911,474 | 6/1999 | Lee | 297/201 |
| 5,911,475 | 6/1999 | Nakahara | 297/219.11 |
| 5,918,931 | 7/1999 | Culbertson | 297/202 |

BICYCLE SADDLE

BACKGROUND OF THE INVENTION

1. Field of the Invention

The present invention relates generally to bicycle saddles and more particularly to a saddle that includes a contoured upper seating surface which primarily supports the rider's ischeal tuberosities and thereby reduces the pressure placed on the perineum.

2. Background of the Related Art

The shape of modern performance oriented bicycle saddles are generally horizontal in profile with a narrow front end portion and a wider rear portion with a concave intermediate portion for inner thigh clearance while riding. Most modern high performance saddles consist of a rigid or semi-rigid molded plastic or nylon shell over which a padded leather, plastic or vinyl cover is fitted. The use of these materials in modern saddles has resulted in a lighter, more durable and more appealing saddle than those of even a few years ago, but the seat contours have remained substantially the same. The desired characteristics of a good high performance or competitive saddle include minimal weight, stiffness, comfort, and a functional outer surface contour which aids in rider performance during competitive cycling.

A traditional road saddle design is generally comprised of a plastic shell, padding, a seat cover, and a suspension rail for mounting the saddle on the bicycle. The rail is made from a piece of relatively thick metal wire (e.g., about ¼ inch diameter), bent into a complex shape. The rail is attached to the shell by inserting it under a moderate preload compression into sockets molded into the forward and rear edges of the shell. Foam padding is applied to the outer surface of the shell, and the cover, usually leather, is applied over the padding. The preload secures and stiffens the shell slightly. The rails are slightly longer than the maximum distance between the front sockets, causing the rails to deflect slightly when they are seated into the sockets. The rider's pelvis normally bears on the saddle near the center when viewed from the side view. The padding deforms elastically to provide a cushion for the rider, and the shell elastically deforms a small amount under this load to provide additional cushioning.

The popularity of off-road cycling has increased dramatically over the last decade. However, the riding conditions of off-road cycling are significantly more rugged than in-road cycling, thus requiring the development of new, high performance parts for off-road bicycles. The initial designs for these parts often start with parts initially intended for road cycling. Road designs are often not optimal for the new applications and are subsequently improved as the shortcomings are exposed and understood. Saddles for off-road bicycles are typical of this development.

A recent trend in the art has been the manufacture of extremely lightweight racing saddles which make extensive use of advances in materials technology to achieve a reduced overall weight. These saddles typically employ a lightweight perforated resin nylon base shell which is mated to a pair of titanium rails arranged along the underside shell (or base) surface in the conventional manner. The top surface of the nylon based shell is provided with dense foam padding and a leather covering stretched thereover and secured to the underside of the shell. A common problem with these and similar ultra light saddle designs is the tendency of the saddle rails to sag or bend after extensive use. This causes extreme discomfort to the rider as the hard contact points of the pelvic bones ride on the unnatural bowed upward bend of the saddle shell which is no longer held in a desired pelvic supporting position in view of the bent support rails. These ultra lightweight saddles also do not hold up well under a rigorous riding environment such as encountered in mountain biking. Also these saddles, while aimed at that high performance market, do not contain a rear saddle region contour which permits the desired freedom of movement in getting on and off the saddle.

The desired competitive saddle must also adequately support and distribute the load associated with the pressure points of the rider's lower pelvis region on the saddle surface to ensure rider comfort for prolonged periods of use. While most modern day saddle manufacturers take advantage of advances made in plastics, composites and metallurgy for designing a saddle which is both lightweight and comfortable, compromises are usually made to one or more of the desired characteristics of the ideal performance saddle.

Given the priority that competitive cycling puts on durability and light weight, enthusiasts desire a more comfortable saddle but are unwilling to decrease its strength or increase its weight. Consequently, there is a need for a new saddle bicycle that retains the high strength/low weight characteristics of traditional road saddles, while at the same time increasing the rider's comfort.

SUMMARY OF THE INVENTION

A bicycle saddle that includes a novel contoured upper seating surface which primarily supports the rider's ischeal tuberosities and thereby reduces the pressure placed on the perineum is disclosed. The saddle is essentially constructed from a shell, foam padding, leather cover, and a suspension rail for mounting the saddle onto a bicycle. The shell, padding and cover in particular are fabricated in especially novel shapes and are assembled in an especially novel fashion so as to produce the desired contour for the seating surface for the rider.

In particular, the seating surface of the saddle includes laterally spaced apart right and left posterior support surfaces for supporting primarily the right and left ischeal tuberosities of the bicycle rider. The right and left posterior support surfaces are formed by a substantially V-shaped open space extending forwardly from a rear edge of the posterior portion of the saddle and terminating at an apex, and also formed by a central, longitudinally extending depression extending from the apex forwardly to the anterior portion of the saddle.

The invention disclosed herein includes a variation wherein the foam padding is comprised of a first pad and a second pad designed especially for female riders. The first pad, which is comparatively quite soft, covers a central portion of the anterior portion of the shell. The second pad, which provides cushioning but is relatively firmer than the first pad, covers the posterior portion of the shell and also surrounds the first pad thereby covering the extreme side portions and extreme forward portion of the anterior portion of the shell.

The novel bicycle saddle disclosed herein therefore provides a seating surface supporting the rider's weight on the area of the body that is most suited for long distance, competitive riding, thereby reducing rider fatigue. Other objects and advantages of the invention will be apparent to those skilled in the arts of bicycle riding and bicycle design.

BRIEF DESCRIPTION OF THE DRAWINGS

The drawings, of which

FIG. 1 is a top view of the bicycle saddle.

FIG. 2 is a bottom view of the bicycle saddle.

FIG. 3 is a side view of the left side of the bicycle saddle, with right side being a mirror image of FIG. 3.

FIG. 4 is a front view of the bicycle saddle.

FIG. 5 is a rear view of the bicycle saddle.

FIG. 6 is a partial sectional side view of the bicycle saddle.

FIG. 7 is a top view of a second embodiment of the bicycle saddle of the present invention.

FIG. 8 is a bottom view of the second embodiment.

FIG. 9 is a side view of the left side of the second embodiment, with the right side being a mirror image of FIG. 9.

FIG. 10 is a front view of the second embodiment.

FIG. 11 is a rear view of the second embodiment.

FIG. 12 is a partial sectional side view of the second embodiment.

DETAILED DESCRIPTION OF THE PREFERRED EMBODIMENTS

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

Figure 1:
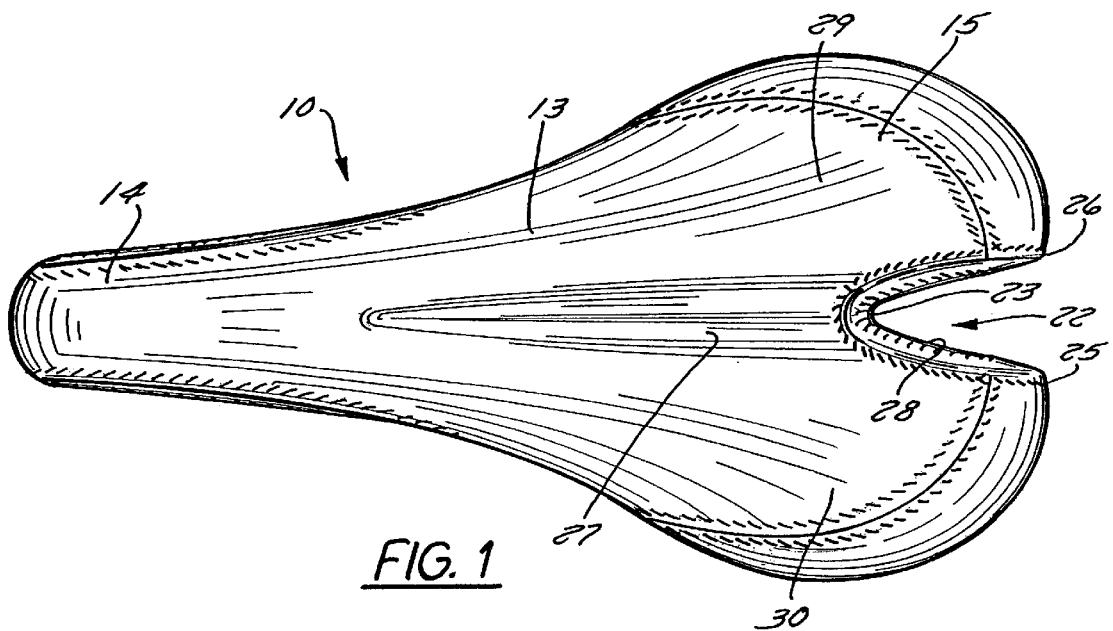
FIGS. 1–6 illustrate a first embodiment of the present invention and FIGS. 7–12 illustrate a second embodiment, include the following.
Figure 2:
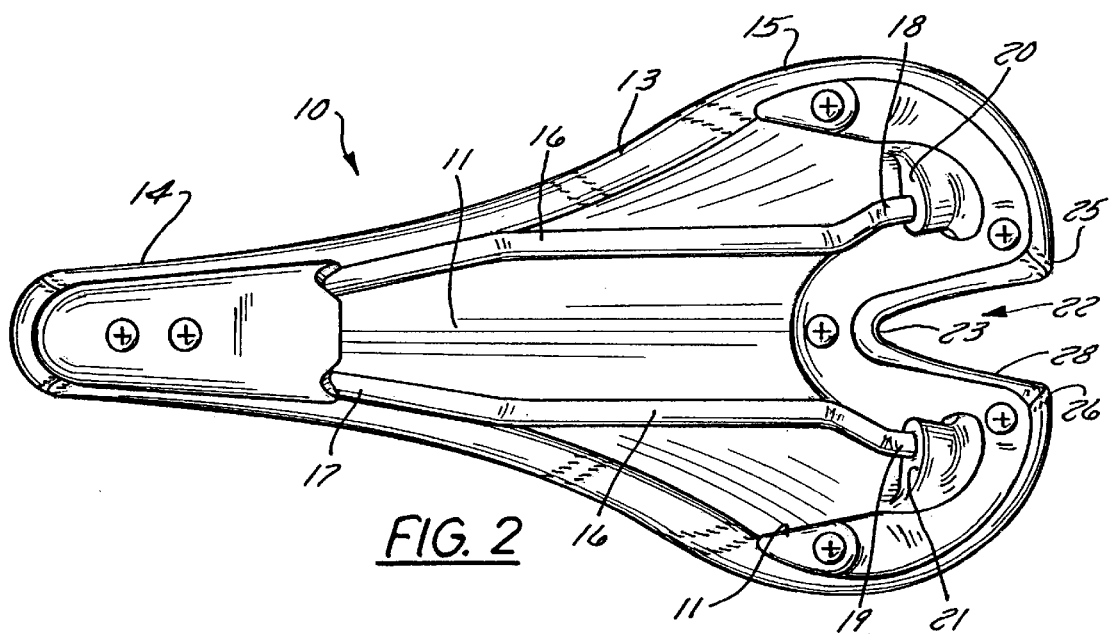
Figure 3:
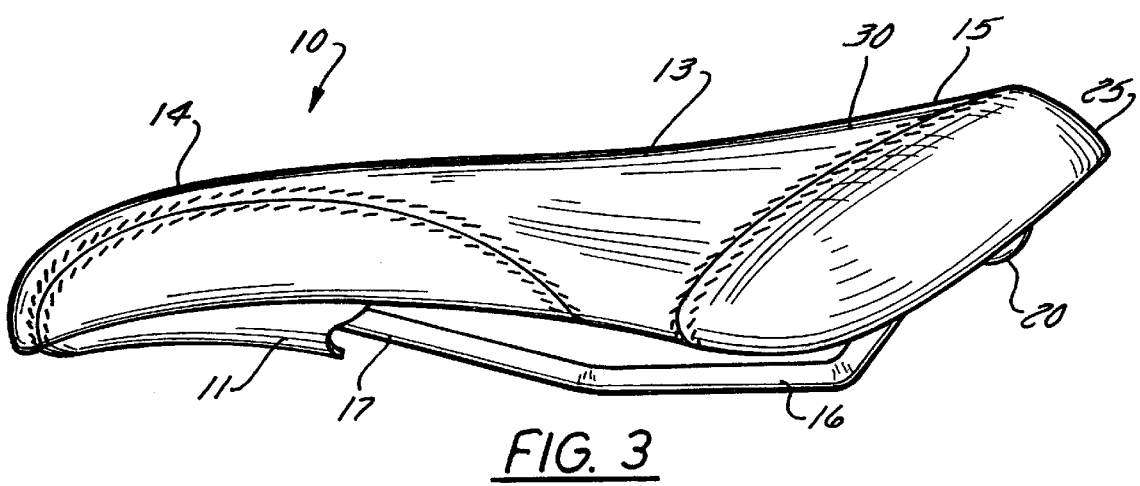
Figure 4:
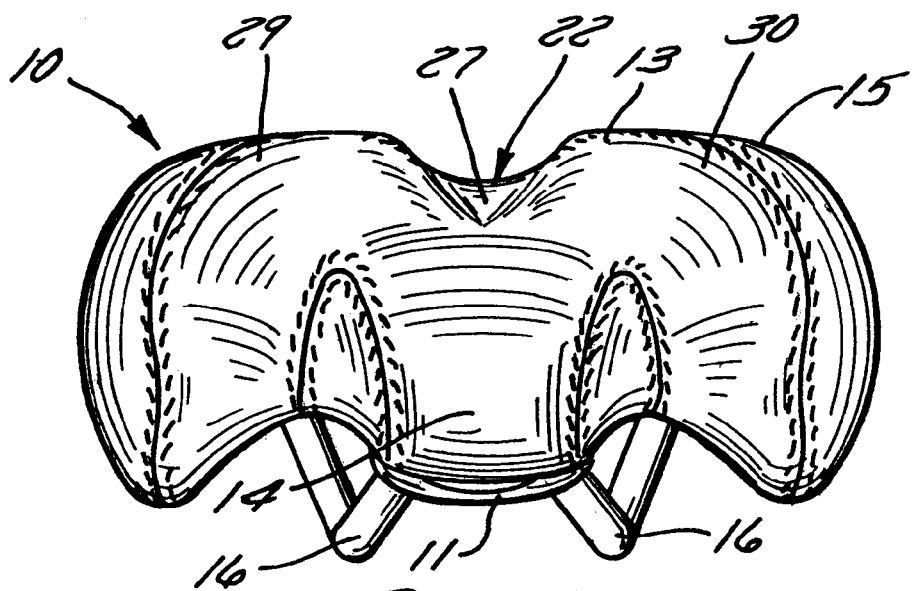
Figure 5:
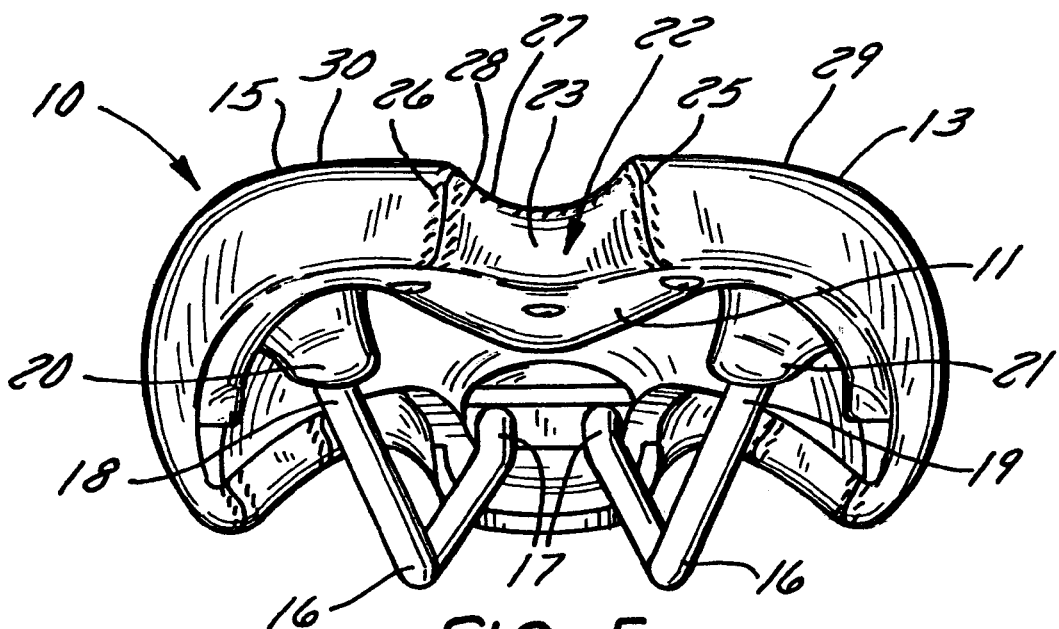
Figure 6:
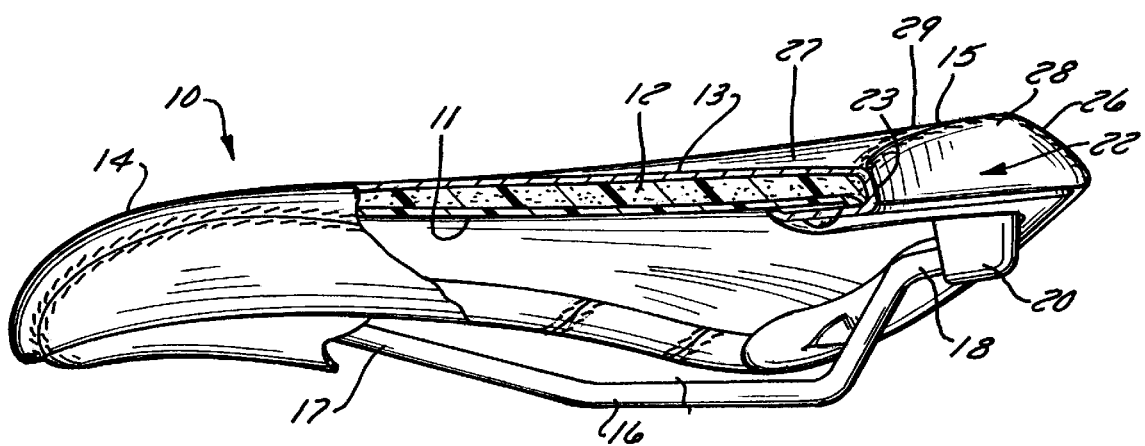

A bicycle saddle constructed in accordance with one embodiment of the present invention is shown in FIGS. 1–6 and generally designated as numeral 10. The saddle 10 is preferably constructed in accordance with known manufacturing techniques in that it consists of an underlying molded plastic shell 11 having a dense foam padding 12 placed along the upper surface of the shell and a cover material 13, preferably calf leather, stretched over the padding and secured to the underside of the shell, preferably by adhesive bonding. The upper surface of the leather cover of course provides the seating surface that the rider sits on.

The underlying shell 11 may be fabricated out of injection molded polypropylene, polyurethane, ABS co-polymer or other like plastic material in a monocoque construction. The density and molecular weight of the selected plastic should be sufficiently high to provide a relatively rigid construction. The shell preferably permits some flexure at applied pressure points, yet should not be so flexible so as to promote fatigue, inefficiency or inadequate support.

The shell 11 has a relatively narrow anterior portion or front part 14, commonly referred to as the "nose," which becomes progressively narrower towards its front end. The shell 11 further comprises a relatively wide posterior portion or rear part 15 to form the seat. Without limiting the invention to specific dimensions, the nose is preferably about 1¼ inch to 2 inches wide, and in any event, the nose is of a size and shape which fits comfortably between the crotch of a bicycle rider; the rear part of the saddle is preferably about 5 to 6 inches wide, and in any event the rear part is of a size and shape suitable for supporting the buttocks of a rider; the overall length of the saddle is preferably about 9-¾ to 12 inches.

The bicycle saddle 10 further comprises a suspension rail 16 for attaching the saddle to the bicycle. Specifically, the rail 16 comprises a substantially V-shaped metal wire which has been bent in order to form a forward portion 17 which is attached underneath the nose of the saddle. The tips of the wire form a first rear end 18 and second rear end 19 of the wire, which are attached under the rear part of the saddle. The forward portion 17 of the rail 16 is attached to the shell 11 by an anterior coupling means underneath the nose 14 of the saddle, and the rear tips of the rail 18 and 19 are attached to the shell by a posterior coupling means underneath the rear part of the saddle. The anterior coupling means preferably includes a means for providing resilient movement of the nose when the rider shifts his or her weight to the front part of the saddle. The means for providing such resilient movement is preferably of the type disclosed in the applicant's U.S. Pat. No. 5,765,912, which in that regard is incorporated herein by reference. Briefly, the anterior coupling means comprises a resilient pad placed underneath the nose between the shell and front end of the rail. The posterior coupling means preferably comprises a first socket 20 and a second socket 21 molded into the underside of the shell. The first and second rear tips of the rail, 18 and 19, are inserted into the first and second rear sockets, 20 and 21, respectively.

The posterior portion 15 of the bicycle saddle includes a substantially V-shaped open space 22. Specifically, the V-shaped open space 22 extends forwardly from the rear edge of the posterior portion 15 of the saddle and terminates at an apex 23. The V-shaped open space is at its widest point preferably about 1 inch wide. In other words, the left side edge 25 of the rear edge of the posterior portion of the saddle is spaced apart about 1 inch from the right side edge 26 of the rear edge of the rear portion of the saddle. The V-shaped open space 22 extends from the rear edge of the posterior portion forwardly about 1½ to 2 inches to the apex.

The upper seating surface of the cover 13 also includes a central, longitudinally extending depression or groove 27 extending from the apex 23 of the V-shaped open space 22 forwardly to the anterior portion 14 of the saddle. The V-shaped open space 22 in effect forms an interior side wall portion 28 of the cover 13. The interior side wall portion 28 essentially pulls the central portion of the cover 13 downwardly toward the upper surface of the shell 11, thereby forming the depression or groove 27 in the central portion of the seating surface of the saddle.

The V-shaped open space 22 and the central longitudinally extending depression 27, in combination, effectively divide the seating surface of the saddle into a right posterior support surface 29 and a left posterior support surface 30. The left and right posterior support surfaces are laterally spaced apart preferably about 2 to 3 inches. The right and left posterior support surfaces are designed for supporting primarily the right and left ischeal tuberosities of the bicycle rider, respectively. Additionally, the V-shaped open space 22 and central groove 27 effectively lower the seating surface in a direction away from the rider's pelvis, thereby reducing the amount of pressure placed on the central portion of the rider's pelvis particularly in the area of the perineum.

Figure 7:
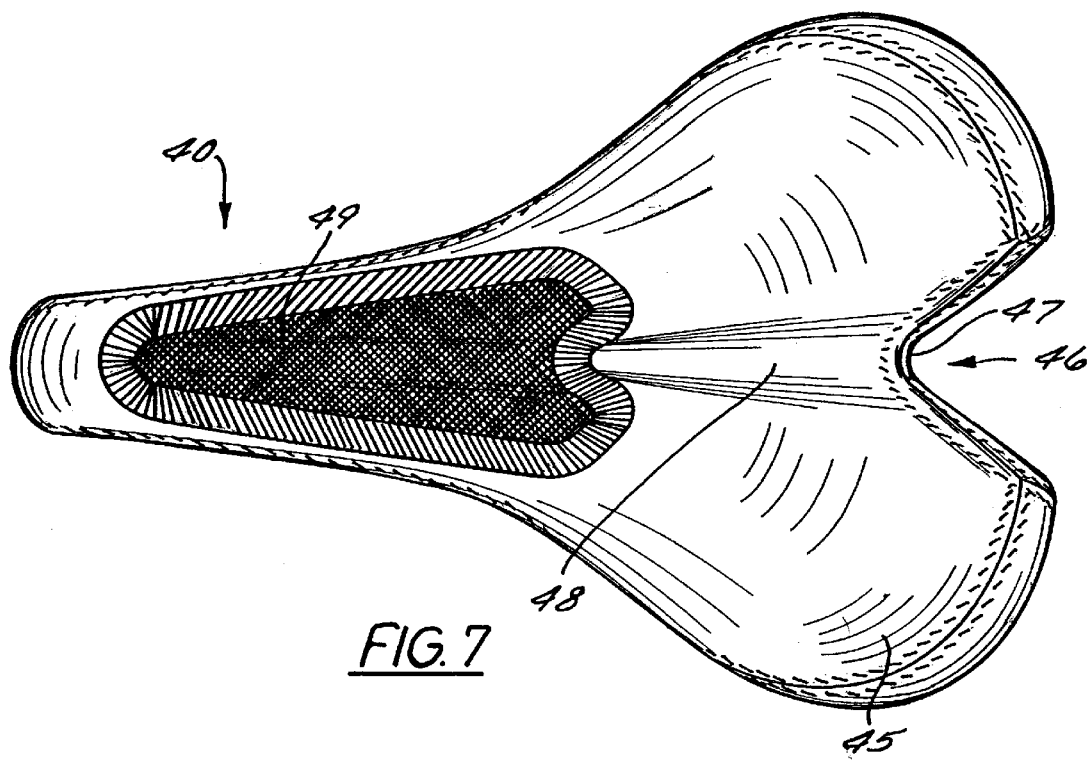
Figure 8:
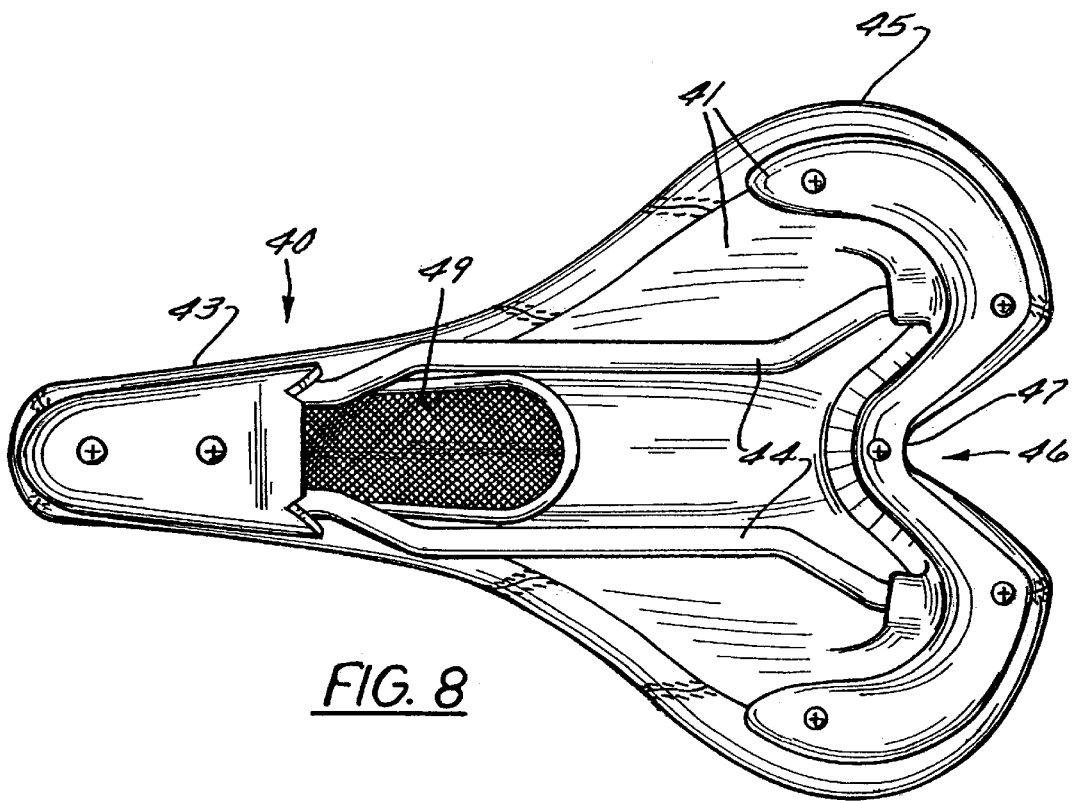
Figure 9:
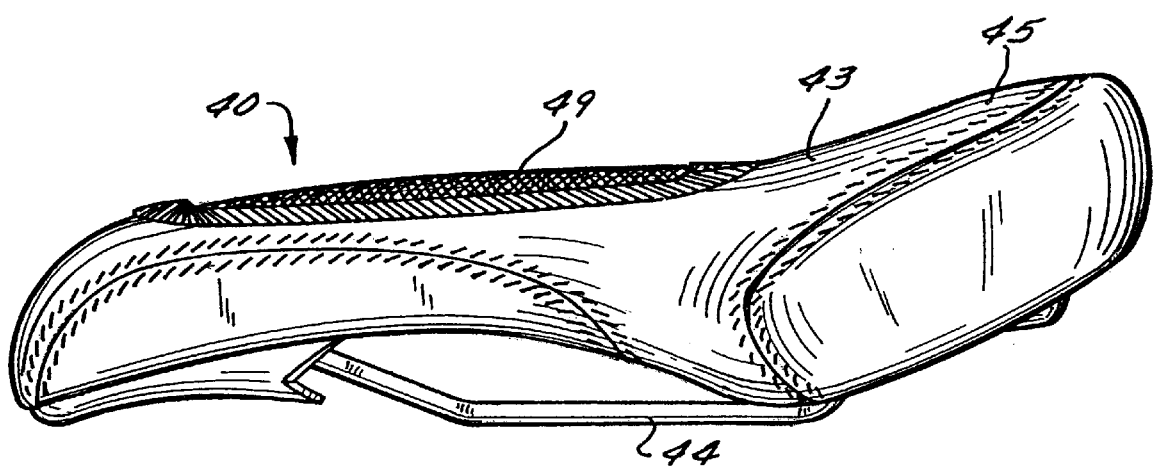
Figure 10:
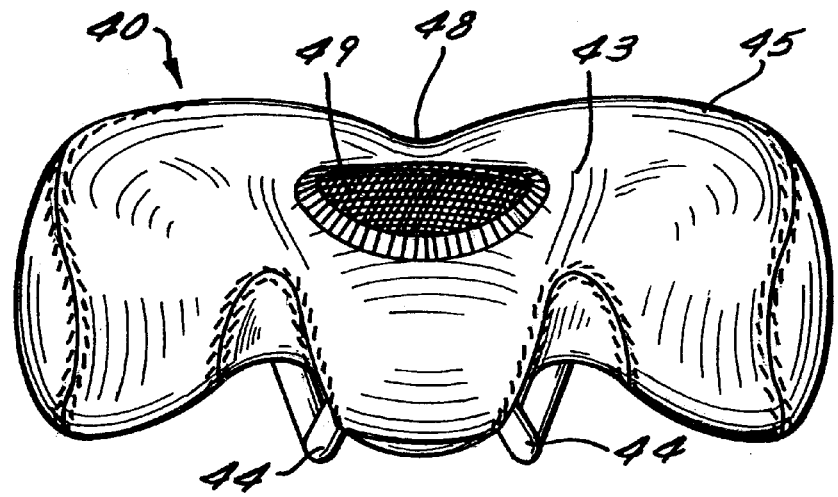
Figure 11:
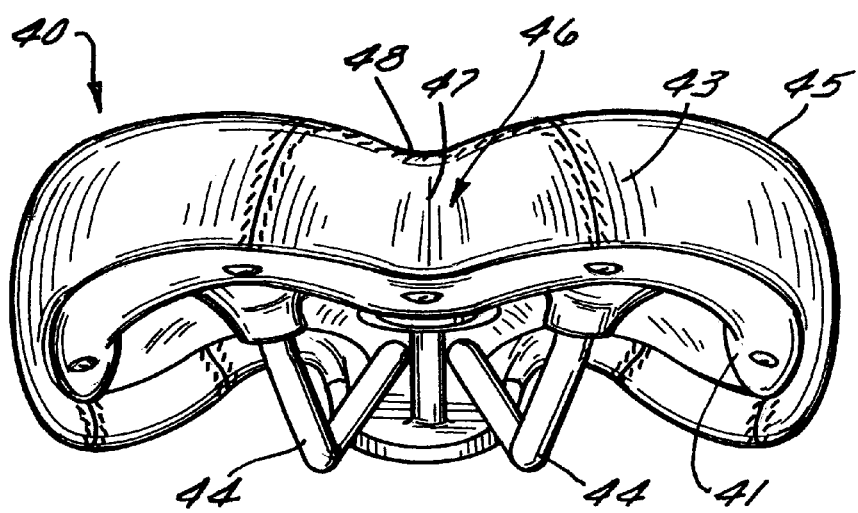
Figure 12:
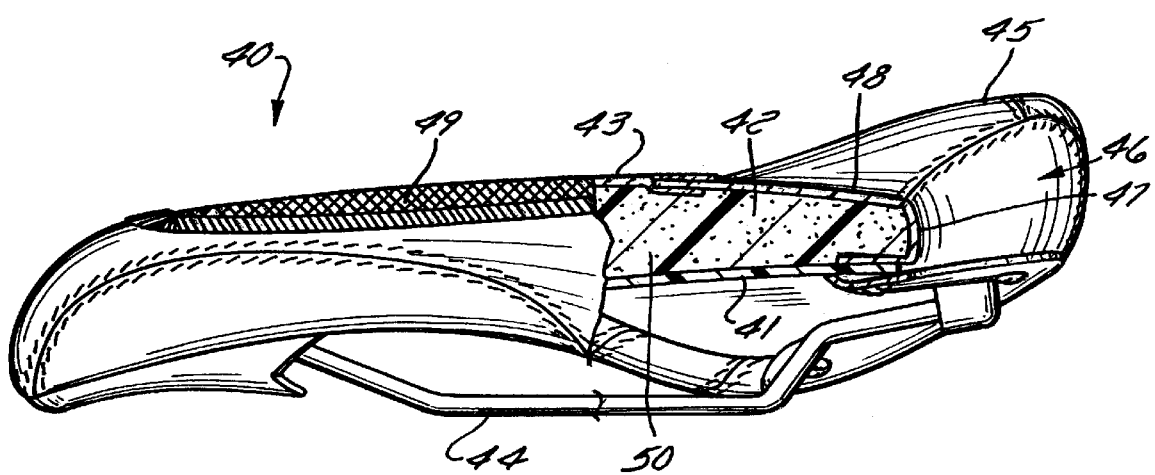

The principles of the present invention may be modified to provide a first embodiment uniquely adapted for male bicycle riders, and a second embodiment uniquely adapted for female bicycle riders. The detailed description set forth above has been made primarily in reference to the first embodiment for male riders illustrated in FIGS. 1–6 of the drawings. The women's bicycle saddle 40 illustrated in FIGS. 7–12 likewise comprises essentially a shell 41, foam padding 42, leather cover 43, and suspension rail 44 for mounting the saddle onto a bicycle. The width of the posterior portion 45 of the women's saddle is slightly wider than the men's version, but the women's saddle likewise includes a V-shaped open space 46 extending forwardly from the rear edge of the posterior portion of the saddle and terminating at an apex 47. The women's saddle likewise includes a central longitudinally extending depression 48 extending from the apex of the V-shaped open space forwardly to the anterior portion of the saddle.

For the women's saddle, the foam padding is preferably comprised of a first pad 49 and a second pad 50. The first pad 49 comprises a relatively narrow elongated pad which covers a central portion of the anterior portion of the shell. The second pad 50 covers the entire posterior portion of the shell, and the second pad also surrounds the first pad thereby covering the extreme side portions and extreme forward portion of the anterior portion of the shell. Preferably, the first pad 49 is slightly softer and therefore provides more cushioning effect in comparison to the second pad 50. Also, preferably, the seat cover 43 for the women's version includes a first portion and a second portion, the first portion being made of a soft fabric material and covering only the first pad, while the second portion is made from relatively stiffer and more durable leather.

For both the men's and women's versions of the bicycle saddle, the central depression is deepest in the rearmost portion of the depression. With reference in particular to FIGS. 1, 4, 5 and 6 for the men's version, and FIGS. 7, 10, 11 and 12 of the women's version, the rearmost portion of the central depression of the seating surface is preferably about ¼ to ⅜ inches lower than the right and left posterior support surfaces. As the central depression extends forwardly from the apex of the V-shaped open space, the depth of the depression becomes gradually reduced until the groove merges into the flat upper portion of the anterior portion of the cover on the saddle. thereby reduces the amount of pressure applied by the rider's weight onto the perineum area. Although the bicycle saddle of the present invention has been described with specific reference to certain dimensional parameters, methods of coupling the suspension rail to the shell of the saddle, and so forth, alternative means may be employed so long as they perform substantially the same function in substantially the same way to achieve substantially the same result. Therefore, specific structural and functional details disclosed above are not to be interpreted as limiting the scope of the invention, but as presented herein merely to provide a basis for the claims and for teaching one skilled in the art to variously employ the present invention in any appropriately detailed manner. Changes may be made in the details of manufacture or structure of the invention without departing from the spirit of the invention, especially as defined in the following claims.

What is claimed is:

1. A bicycle saddle for seating a bicycle rider, said bicycle rider having right and left ischeal tuberosities, said bicycle saddle comprising:

a shell, said shell having an upper surface and an underside, and said shell defining a relatively narrow anterior portion of the bicycle saddle which fits between said bicycle rider's crotch, and said shell further defining a relatively wider posterior portion of the bicycle saddle for supporting said bicycle rider's buttocks;

a suspension rail for mounting said bicycle saddle to a bicycle, said rail comprising a metal wire having a first rear end, a second rear end, and a bent front portion, with the first rear end and second rear end being coupled under the posterior portion of the shell, and the bent front portion being coupled under the anterior portion of the shell;

foam padding covering the upper surface of the shell;

a cover covering over the foam padding and thereby providing a seating surface for the bicycle rider to sit on;

the posterior portion of the bicycle saddle including a substantially V-shaped open space, said V-shaped open space extending forwardly from a rear edge of the posterior portion of the saddle and terminating at an apex;

the seating surface including a central, longitudinally extending depression extending from the apex of the V-shaped open space forwardly to the anterior portion of the saddle; and said V-shaped open space including an interior side wall portion that pulls a central portion of the cover downwardly toward the upper surface of the shell, thereby forming the depression in the seating surface;

wherein the V-shaped open space and the central, longitudinally extending depression effectively divide the seating surface of the saddle into laterally spaced apart right and left posterior support surfaces for supporting the right and left ischeal tuberosities of the bicycle rider, respectively.

2. The bicycle saddle of claim 1, wherein:

the anterior portion is about 1¼ inch to 2 inches wide;

the posterior portion is about 5 inches to 6 inches wide;

and the bicycle saddle has an overall length of about 9-¾ to 11 inches; and the right and left posterior support surfaces are spaced apart laterally by about 3 to 4 inches.

3. The bicycle saddle of claim 2, wherein the V-shaped open space extends from the rear edge of the posterior portion forwardly about 1½ to 2 inches.

4. The bicycle saddle of claim 3, wherein the central depression in the seating surface has a lowermost portion located adjacent to the apex of the V-shaped open space, and the lowermost portion is about ¼ to ⅜ inches lower than the right and left posterior support surface.

5. The bicycle saddle of claim 4, further comprising a resilient pad between the underside of the anterior portion of the shell and the forward portion of the suspension rail for providing resilient movement therebetween.

6. The bicycle saddle of claim 4, wherein the foam padding is comprised of a first pad and a second pad;

said first pad covers a central portion of the anterior portion of the shell; and said second pad covers the posterior portion of the shell and said second pad surrounds the first pad thereby covering side portions of the anterior portion of the shell.

7. The bicycle saddle of claim 6, wherein the first pad is softer than the second pad.

8. The bicycle saddle of claim 1, wherein the foam padding is comprised of a first pad and a second pad;

said first pad covers a central portion of the anterior portion of the shell; and said second pad covers the posterior portion of the shell and said second pad surrounds the first pad thereby covering side portions of the anterior portion of the shell.

9. A bicycle saddle for seating a bicycle rider, said bicycle rider having right and left ischeal tuberosities, said bicycle saddle comprising:

a shell, said shell having an upper surface and an underside, and said shell defining a relatively narrow anterior portion of the bicycle saddle which fits between said bicycle rider's crotch, and said shell further defining a relatively wider posterior portion of the bicycle saddle for supporting said bicycle rider's buttocks;

a suspension rail for mounting said bicycle saddle to a bicycle;

foam padding covering the upper surface of the shell, said foam padding being comprised of a first pad and a second pad, said first pad covering a central portion of the anterior portion of the shell and said second pad covering the posterior portion of the shell, said second pad further surrounding the first pad and thereby covering side portions of the anterior portion of the shell;

a cover covering over the foam padding and thereby providing a seating surface for the bicycle rider to sit on;

the posterior portion of the bicycle saddle including a substantially V-shaped open space, said V-shaped open space extending forwardly from a rear edge of the posterior portion of the saddle and terminating at an apex; and, the seating surface including a central, longitudinally extending depression extending from the apex of the V-shaped open space forwardly to the anterior portion of the saddle;

wherein the V-shaped open space and the central, longitudinally extending depression effectively divide the seating surface of the saddle into laterally spaced apart right and left posterior support surfaces for supporting the right and left ischeal tuberosities of the bicycle rider, respectively.

10. The bicycle saddle of claim 9, wherein:

the anterior portion is about 1¼ inch to 2 inches wide;

the posterior portion is about 5 inches to 6 inches wide;

and the bicycle saddle has an overall length of about 9-¾ to 11 inches; and the right and left posterior support surfaces are spaced apart laterally by about 3 to 4 inches.

11. The bicycle saddle of claim 9, wherein the V-shaped open space extends from the rear edge of the posterior portion forwardly about 1½ to 2 inches.

12. The bicycle saddle of claim 9, wherein the central depression in the seating surface has a lowermost portion located adjacent to the apex of the V-shaped open space, and the lowermost portion is about ¼ to ⅜ inches lower than the right and left posterior support surface.

13. The bicycle saddle of claim 9, wherein the first pad is softer than the second pad.

14. The bicycle saddle of claim 9, further comprising a resilient pad between the underside of the anterior portion of the shell and the forward portion of the suspension rail for providing resilient movement therebetween.

\* \* \* \* \*